March 28, 1967  W. L. GALLAGHER ETAL  3,311,001

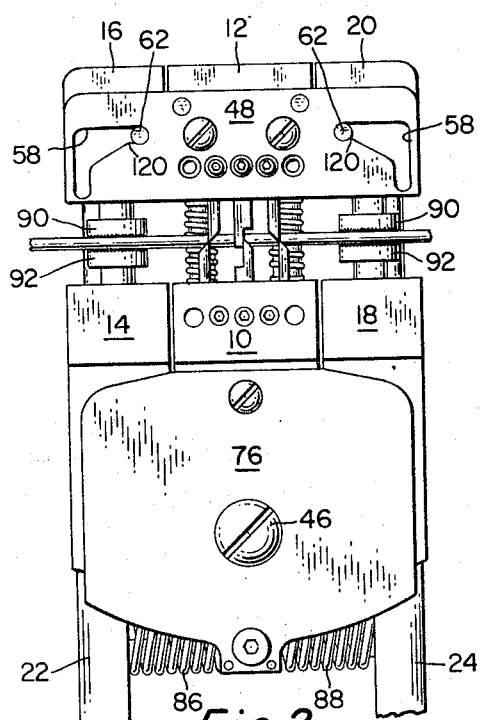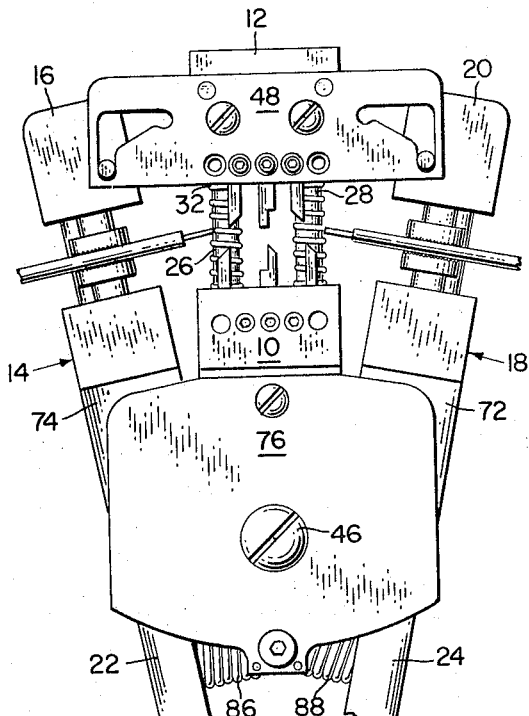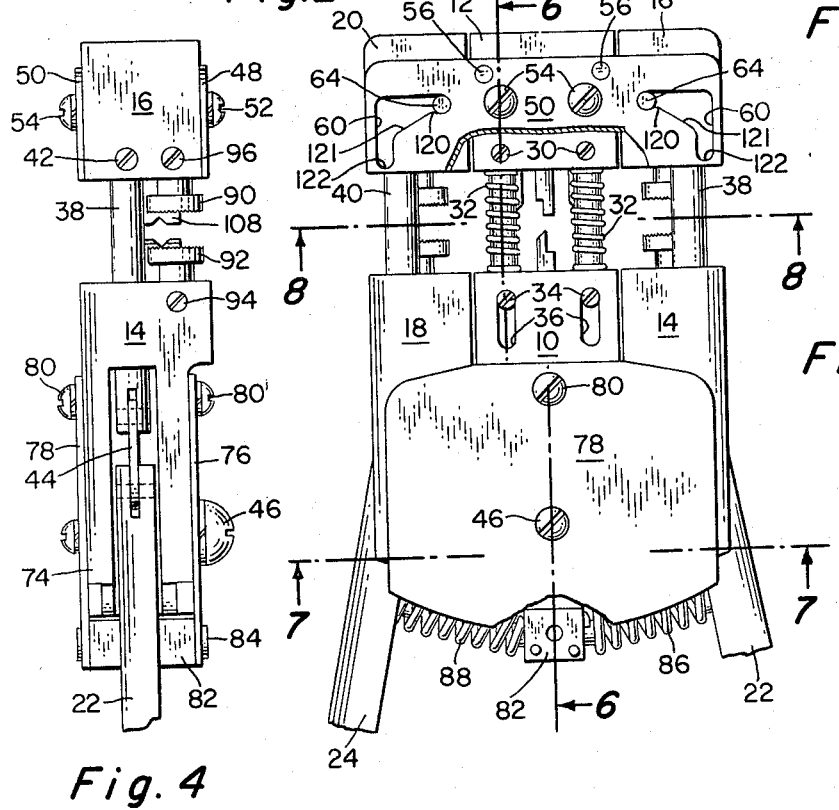

WIRE STRIPPER

Filed Feb. 28, 1966

United States Patent Office 3,311,001
Patented Mar. 28, 1967

3,311,001
WIRE STRIPPER
Warren L. Gallagher, 505 Oxnard Road, and Robert B. Gunyan, 1721 Saratoga St., both of Oxnard, Calif. 93030
Filed Feb. 28, 1966, Ser. No. 532,540
10 Claims. (Cl. 81—9.5)

The invention described herein may be manufactured and used by or for the Government of the United States of America for governmental purposes without the payment of any royalties thereon or therefor.

This invention relates to devices for cutting insulated wire or the like and particularly to devices for simultaneously stripping the insulating coating from the ends of the cut wire.

Heretofore machines have been devised for cutting a length of wire and for stripping insulation from the end of the severed wire. Most such machines are large and cumbersome and require experienced operating personnel. Furthermore such machines are intended for mass production operation and must be adjusted to the requirements of such production run. Though hand wire strippers and separate hand wire cutters have been proposed such devices are usually single operation in nature or if they both cut and strip they strip only one of the severed ends.

It is an object of the present invention to provide a combination wire cutter and stripper which will not only accurately cut a wire but will also cleanly strip both cut ends in the same operation.

It is a further object to provide such device in the form of a light weight precision hand tool which is small in size and can readily be operated with one hand.

Another object is to provide a hand tool for such purpose which is rugged in nature, may readily be repaired and wherein the operating parts may easily be replaced without recourse to special equipment.

Still another object is to provide in such tool adjustable features for varying the amount of insulation removed and which uniformly repeats the results time after time.

Other objects, advantages and novel features of the invention will become apparent from the following detailed description of the invention when considered in conjunction with the accompanying drawings wherein;

FIG. 2 is a similar view reduced in size with wire cutting completed and stripping action about to begin.

FIG. 3 is a change position view of the device in FIG. 2 showing stripping completed and cutter and stripping blades withdrawn.

FIG. 4 is a side elevational view of the device of FIGS. 1, 2 and 3.

FIG. 5 is a rear elevational view of the device of FIGS. 1, 2, 3 and 4.

Figure 1:
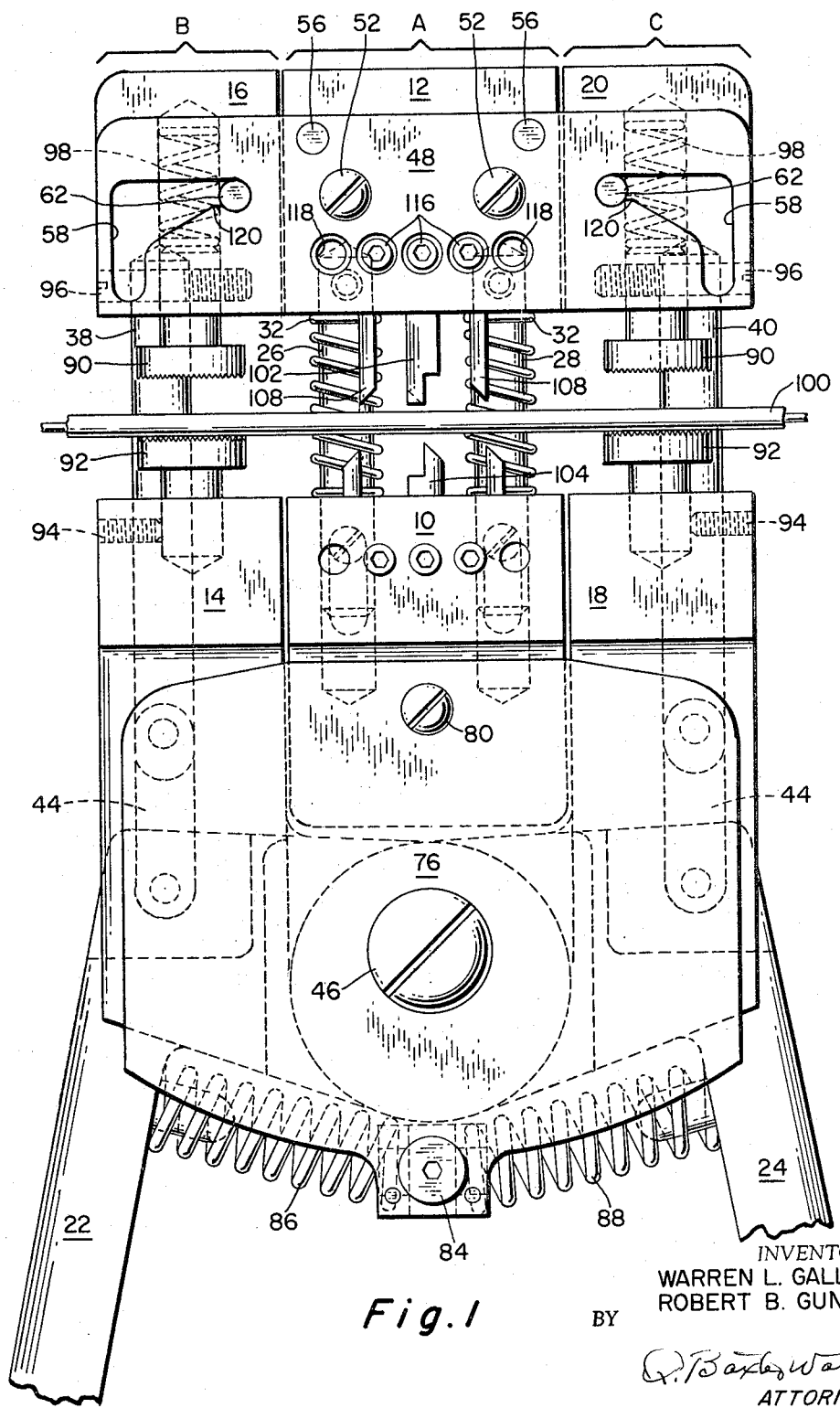
FIG. 1 is a front elevational view of a preferred embodiment of the present invention with a wire in place ready to be cut and stripped.

Referring now to the drawings in detail wherein like numbers refer to corresponding parts throughout the several views there is depicted a hand operated combination wire cutter and stripper which operates in accordance with the principles of the present invention. As shown in FIG. 1 the tool may be considered as comprising three main operating components; a medial body component indicated generally by the reference character A, and two laterally located side assemblies one on each side of the medial component and indicated generally by the reference characters B and C. For convenience in understanding this invention the operating parts and their mode of articulation will first be described and thereafter the manner in which a wire is cut and stripped will be explained in detail.

The three tool components are each made up of an upper and lower portion with each upper portion moveable up and down toward and away from its associated lower portion. Thus the medial body component A is formed of a fixed lower block 10 and a moveable upper block 12; the left laterally located assembly B is made up of a fixed lower block 14 and a moveable upper block 16; and the right laterally located assembly C is made up of a fixed lower block 18 and a moveable upper block 20.

The components also are provided with an additional movement with respect to each other in that they are so supported and articulated at their lower portions that the lateral assemblies B and C may swing angularly away from the medial component A upon actuation of operating handles 22 and 24 in a manner hereinafter to be described. The resulting relative position of component A and assemblies B and C is shown generally in FIG. 3.

The components and assemblies are supported, guided and actuated by suitable plates and guide pins. For example the lower medial block 10 is moveably aligned with upper medial block 12 by two leader pins 26–28 which are secured in upper block 12 by any suitable means such as anchor screws 30 (FIG. 5) and are slideably received in openings extending through lower medial block 10. With this arrangement blocks 10 and 12 are kept in alignment but are permitted to move toward and away from each other.

Coil compression springs 32 surround each of the leader pins and normally urge the blocks apart, however leader pin travel is restricted by stops 34 which move in slots 36 located in the lower block 10 (see FIG. 5).

Figure 8:
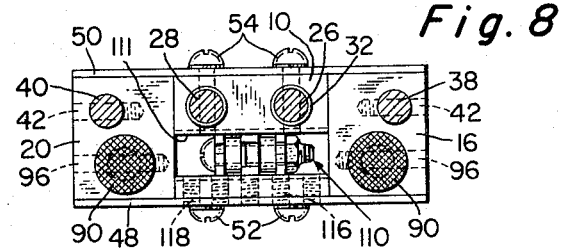
FIG. 8 is a horizontal cross sectional view partially in elevation taken along a line substantially corresponding to line 8—8 of FIG. 5.

The upper and lower blocks of each of the lateral assemblies B and C are guided and also actuated by pull down rods 38 and 40 respectively, each of which is fixed to its respective upper block by an anchor screw 42 (FIG. 8) which is inserted from the outer side of each block. The lower ends of pull down rods 38–40 extend through the lower lateral blocks 14 and 18 respectively and are slideably guided thereby. The bottom of each rod may be bifurcated to receive a flat actuating link 44. Each link 44 in turn is received in a groove formed in the knee of its respective operating handle 22–24. By this arrangement it will be apparent that movement of the handles together pivots them about a pivot point formed by double ended pivot fastener 46 so that as handles 22–24 are moved together the knees and associated links 44 are drawn downwardly pulling down the upper lateral blocks 16 and 20. FIG. 2 shows the parts in the position of maximum downward movement.

In order to maintain all three upper blocks in alignment and to interconnect them for operation together during downward movement there is secured to the front and rear surfaces of the upper medial block 12 elongate front and rear upper block guide and lock plates 48 and 50 respectively, fastened in place by screws 52–54 and maintained in alignment by suitable means such as plate aligning pins 56.

It will be noted that the spaced overhanging portions at each end of lock plates 48–50 snugly embrace the front and rear surfaces of the laterally moveable upper blocks 16 and 20 so as to keep the parts in alignment with the upper medial block 12. In addition, through the use of contoured cam openings 58–60 near opposite ends of each plate, which openings receive cam pins 62–44, the upper lateral blocks are locked together and downward movement of them draws the upper medial block 12 downwardly during the first stage of handle compression.

Figure 6:
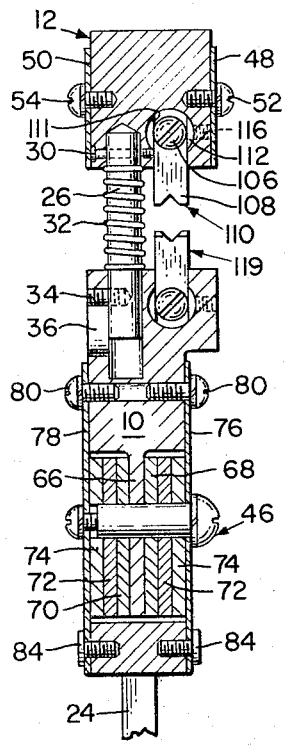
FIG. 6 is a vertical cross sectional view taken along a line substantially corresponding to line 6—6 of FIG. 5.
Figure 7:
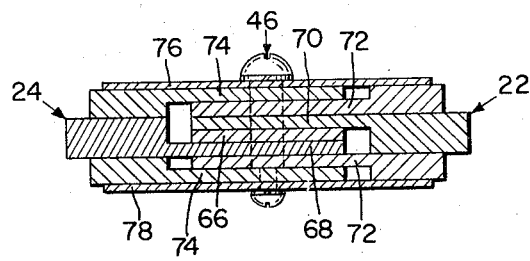
FIG. 7 is a horizontal cross sectional view taken along a line substantially corresponding to line 7—7 of FIG. 5.
Figure 10:
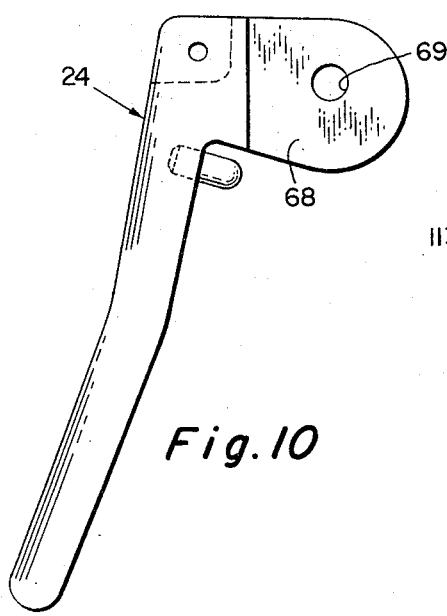
FIG. 10 is a reduced side elevational view of one of the operating handles.

Returning now to a consideration of the lower blocks and their method of support and articulation. The medial block 10 is provided with a central depending web 66 (FIG. 6) on opposite sides of which are positioned bosses 68–70 forming the pivotal upper ends of handles 22–24 respectively one handle being illustrated in FIG. 10. Each boss has a pivot opening 69 therethrough to receive the double ended pivot fastener 46. On opposite sides of such assembly is located first two spaced webs 72 depending from lower block 18, and finally two spaced webs 74 depending from lower block 14. By this means the tool handle and all three components are pivoted about the same central point. Lower block aligning plates 76–78 overlie the entire tool pivot assembly and the double ended pivot fastener 46 holds the parts together. As shown screws 80 may be employed to secure the plates to medial block 10 at their tops and the lower edges of the plates may engage a spacer bar 82 which is held in place by opposed flush type recessed head screws 84. It will be observed that in addition to spacing the plates apart this bar serves as a spring divider or equalizer for the handle springs 86–88 which normally urge handles 22–24 apart.

As best shown in FIG. 1 a pair of opposed upper and lower wire gripping pads 90–92 are provided adjacent opposite sides of the device and, as shown, pads 92 may be anchored into lower lateral blocks 14 and 18 by pad anchor screws 94. The upper pads 90 are each provided with a longitudinally slotted stem to receive a long pad anchoring screw 96. This allows limited displacement of these pads against the resistance of pad compression springs 98. It will be apparent that with this pad arrangement a wire to be stripped such as wire 100, when gripped between the pads, will cause springs 98 to be compressed and, by proper selection of spring strength, the wire is sufficiently gripped to hold it firmly in place during the cutting and stripping operations.

Figure 9:
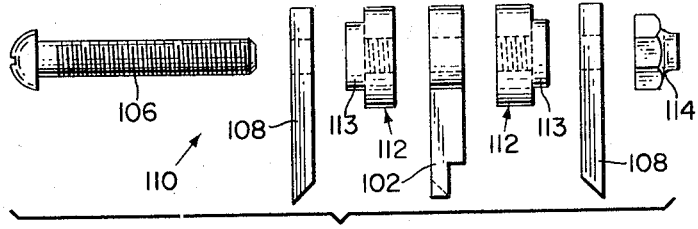
FIG. 9 is an enlarged exploded view of the cutter and stripper blades and clamping mechanism.
Figures 11, 12, 13:
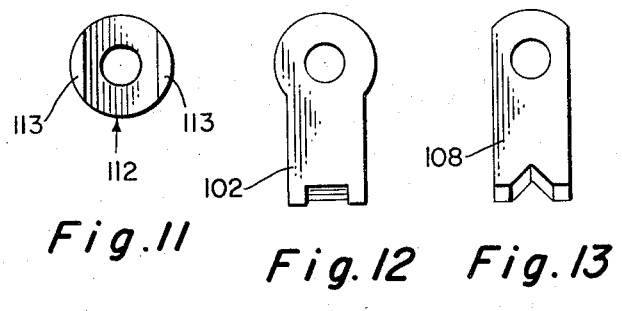
FIG. 11 is an enlarged detailed face view of one of the stripper blade holders of FIG. 9.
FIG. 12 is a similar view of the cutter blade of FIG. 9.
FIG. 13 is a similar view of the stripper blade of FIG. 9.

The cutting and stripping functions are performed by high strength steel upper and lower cutting blades 102–104 which may be of the general configuration shown in FIGS. 9 and 12. As shown in FIG. 9 knife 102 may be centrally mounted upon an aligning screw 106 and notched insulation piercing stripper blades 108 may be positioned on opposite sides thereof through the use of threaded spacers 112 which preferably have slight flanges 113 on opposite sides thereof spaced to receive the upper end of a stripper blade 108. When nut 114 which may be of the self locking type if desired is applied the cutter stripper sub assembly 110 is complete. Such sub assembly may be held firmly in place in a slot in the upper medial block 12, being received in an enlarged portion 111 so that the parts are held in place by anchoring screws 116 three of which are ordinarily used in the manner shown in the drawings. To provide adjustment for length of insulation removed wire stripper blades 108 may be separated any desired amount by the addition of spacing washers to the cutter-stripper subassembly and, to facilitate anchoring the longer assembly, additional threaded anchor screw receiving openings 118 may be provided and additional anchor screws 116 employed therein.

Though only the upper cutter-stripper subassembly 110 has been described it will be apparent that the lower cutter-stripper subassembly 119 may be similarly formed and adjusted and hence it need not be described in detail.

Considering now the operation of the device. As is evident from FIG. 4 the entire front face of the tool is open between the upper and lower block assemblies and thus the tool may readily be applied to wire 100 even in relatively confined quarters. With the wire in place initial movement of the handles together causes pads 90–92 to grip the wire. Further movement of the handles causes the cutting knives 102–104 to sever the wire end and, at the same time, the stripper blades 108–110 penetrate and sever the insulation, but without damage to the wire. This is the position of the parts in FIG. 2.

Finally, complete movement of the handles together causes cam pins 62–64 to override humps 120 in contoured cam openings 58–60 so that pins 64 ride along the sloping cam surfaces 121 and finally enter end slots 122. This allows controlled separation of the side assemblies B and C from medial component A during which lateral movement the insulation is stripped from the ends of the severed wire. This results in positioning the parts as shown in FIG. 3, with the upper medial block 12 having returned to its uppermost position.

Since the stripping operation has been completed release of pressure on the handles will permit the parts to return to their normal at rest relationship as shown in FIG. 1 and the tool is ready for another cutting and stripping operation.

From the foregoing description it will be apparent that there is provided a most useful tool for rapid wire cutting and stripping operations and this tool is light weight and small in size for use in confined quarters such as behind panel boards and inside of housings and compartments. Of course certain of the parts may be made of plastic or the like for economy and ease of manufacture.

When adjusted the device gives uniformly repeatable results and, because all operations are done at the same time, the strippers automatically engage the wire at the right place and remove the desired amount of insulation. This is in contrast to prior constructions where separate cutting and stripping tools are employed or where the unstripped end of a cut wire must be separably and carefully fitted into a tool and stripped by a second operation.

Obviously many modifications and variations of the present invention are possible in the light of the above teachings. It is therefore to be understood that within the scope of the appended claims the invention may be practiced otherwise than as specifically described.

We claim:

1. In a hand tool for cutting insulated wire and stripping insulation therefrom, the combination of:
    an elongate body assembly including a medial component lying substantially along the longitudinal axis thereof and side components disposed on opposite sides of said axis and in a common plane with said medial component, said medial and said side components being designed to receive an insulated wire to be gripped, cut and stripped;
    wire cutting elements on said medial body component;
    insulation piercing and stripping elements on said medial body component;
    wire gripping elements on each of said side components;
    said side components being mounted for coordinated movement toward and away from the medial component;
    actuating means including manually engageable handles for said medial and side component mounted elements to cause them to successively grip, cut and strip a wire received by said components; and
    locking means interconnecting said medial components and side components for common longitudinal movement during the wire cutting operation, said locking means releasing the side components for lateral movement to thereby pull the wire ends through the insulation piercing and stripping elements and strip the insulation therefrom.

2. A device in accordance with claim 1 wherein the medial body component includes upper and lower cutter and insulation piercing blade subassemblies adjustable to vary the length of insulation stripped from the ends of a cut wire.

3. The device of claim 1 wherein the medial component and the side components are interconnected through a common pivot point for angular separation of the side components by rotation thereabout.

4. The device of claim 1 wherein spaced leader pins retain the wire cutting and insulation piercing elements in opposed alignment; and
    separate side element pull down rods maintain the wire gripping elements in alignment.

5. The device of claim 1 wherein the locking means is mounted upon the medial component and serves to guide the side components during lateral stripping movement thereof.

6. The device of claim 1 wherein the locking means includes a cam plate mounted upon said medial component and has a contoured cam slot therein to control interlocking operation; and
    a cam pin on each side component and bearing upon said contoured cam surface.

7. A wire cutting and stripping hand tool comprising:
    a body assembly including a pivot point for a plurality of interarticulated parts;
    a medial component including
    a lower block extending from said assembly, and an upper block extending from said assembly and moveably associated with the lower block to approach and recede therefrom;
    aligned wire cutting and stripping subassemblies including cutter and stripper blades mounted on each of said blocks so as to engage a wire positioned therebetween;
    side components on opposite sides of said medial component;
    each side component including a lower block and an upper block spaced therefrom;
    wire gripping elements mounted in opposition upon each side component upper and lower block so as to engage a wire positioned therebetween;
    each upper wire gripping block being moveably associated with its respective lower wire gripping block to cause the wire gripping elements to approach and recede from a wire positioned therebetween;
    locking means including a cam plate mounted upon said medial component and overlapping the side components;
    said locking means causing the three upper blocks to move downwardly in unison during the first portion of their stroke to cause their respective elements to engage a wire to be cut and stripped;
    said locking means being releasable during the second portion of such movement to permit the side components to move laterally and draw a cut wire end through the stripper blades to remove insulation therefrom.

8. A device in accordance with claim 7 wherein operating handles depend from said body assembly and are interarticulated with said upper and lower blocks so as to actuate the blocks in unison.

9. The device of claim 8 wherein the interarticulated parts are resiliently retained in position to receive a wire.

10. In a hand tool for cutting an insulated wire and stripping back insulation for a predetermined distance from the free ends of the wire portions formed by the cutting operation;
    an elongated body member including a mechanical linkage mechanism;
    handles extending outwardly from said linkage mechanism and designed to operate the latter when manually operated to closed position;
    three wire-engaging assemblies extending longitudinally outwardly from said body member, each wire-engaging assembly being made up of two co-acting components designed for movement relative to one another upon operation of said handles;
    one of said wire-engaging assemblies lying along the longitudinal axis of said body member and comprising a fixed component mounted on said body member and a moveable component connected to said linkage mechanism and moveable toward said fixed component along the longitudinal axis of said body member;
    the remaining two of said wire-engaging assemblies lying on opposite sides of said one assembly considered with respect to the planes of said cover plates, each of said remaining two wire-engaging assemblies comprising two co-acting components connected to said linkage mechanism and designed for movement upon a manual operation of said pair of handles, the movement of each of the co-acting components of said remaining two wire-engaging assemblies being relative to one another in a manner similar and parallel to that of the two co-acting components of said one wire-engaging assembly during an initial manual operation of said pair of handles, with the movement of the two co-acting components of each of the said remaining two wire-engaging assemblies being laterally outwardly as a unit from the said one wire-engaging assembly during a terminal manual operation of said pair of handles;
    a pair of mating wire-cutting elements respectively carried on the two components of said one wire-engaging assembly and designed to cut an insulated wire extending transversely through all three said wire-engaging assemblies upon a manual actuation of said pair of handles;
    two pairs of mating insulation-piercing elements also respectively carried on the two components of said one wire-engaging assembly, one of said pairs of insulating-piercing elements lying on each side of said pair of wire-cutting elements;
    both said pair of wire-cutting elements and said two pairs of insulation-piercing elements being designed for operation during the said initial manual operation of said pair of handles; and
    two pairs of wire-gripping elements respectively carried on the said remaining two wire-engaging assemblies and designed to grip the said insulated wire during the said initial manual operation of said pair of handles;
    whereupon a subsequent movement of the said remaining two wire-engaging assemblies laterally outwardly during a terminal manual operation of said pair of handles will cause the respective wire portions produced by the prior action of the said pair of wire cutting elements and held by the said two pairs of wire-gripping elements to be drawn laterally outwardly and result in the insulation being stripped back for a predetermined distance from the respective ends of such wire portions, such stripping action being made possible by the prior action of the said two pairs of insulation-piercing elements.

References Cited by the Examiner

UNITED STATES PATENTS

| | | | |
|---|---|---|---|
| 2,934,982 | 5/1960 | Eubanks | 81—9.51 |
| 3,125,909 | 3/1964 | Hindenburg | 81—9.5 |

WILLIAM FELDMAN, *Primary Examiner.*

M. MEHR, *Examiner.*